3,546,302
PROCESS FOR BROMINATING PHENOLS
Arthur A. Asadorian, Midland, and Ronald G. Tigner, North Bradley, Mich., assignors to The Dow Chemical Company, Midland, Mich., a corporation of Delaware
No Drawing. Filed Apr. 3, 1964, Ser. No. 357,259
Int. Cl. C07c 37/12, 37/18, 39/16
U.S. Cl. 260—619                                11 Claims

ABSTRACT OF THE DISCLOSURE

A process for brominating phenols in the ortho- and para-positions by reacting a phenol with a brominating agent in the presence of a solvent system consisting essentially of an organic solvent phase and an aqueous phase.

---

The present invention relates to a new chemical process whereby phenols are brominated to make products of improved color and purity.

Previous methods of brominating phenols include reacting bromine with a phenol in the absence of a solvent and, more commonly, with the phenol dissolved in an anhydrous solvent such as carbon tetrachloride, carbon disulfide, or acetic acid. The brominated products obtained, particularly the polybrominated products, however, are usually discolored and relatively impure and must be purified by distillation or recrystallization to get a brominated phenol of good quality. Phenols have been brominated in water solution or suspension but the same difficulties are encountered and the reaction is often inconveniently slow when the phenol is insoluble in water. Recently, Dietzler has described in U.S. Pat. 3,029,291 a method for brominating bisphenols in a homogeneous aqueous lower alkanol solution. Products of improved quality are obtained, but even by this method the brominated bisphenols must be further purified to produce white materials of the highest purity.

It has now been found that in the bromination in a substantially liquid system of a phenol having at least one nuclear hydrogen atom ortho or para to the phenolic hydroxyl group and replaceable by bromine, a high yield of a brominated phenol product substantially free of colored impurities and other byproducts is obtained when the bromination is run in the presence of a two phase solvent system, said solvent system consisting essentially of 0.2–20 volumes of water and one volume of an unreactive water-immiscible normally liquid organic solvent. By the term unreactive is meant substantially unreactive under conditions of the reaction with the reactants and products, i.e., the phenol, bromine, and hydrogen bromide. Suitable solvents have a boiling point of about 35° C. to about 150° C. preferably about 35–100° C. Solvents thereby included comprise alkanes of five to about ten carbon atoms, preferably straight chain alkanes such as n-pentane, n-hexane, n-octane, and the like, carbon disulfide, benzene, fluorobenzene, chlorobenzene, and halogenated lower alkanes of 1–6 carbon atoms such as methylene chloride, chloroform, carbon tetrachloride, ethylene dichloride, trichloroethane, propylene dichloride, dibromotetrafluoroethane, trichlorotrifluoroethane, tetrachlorodifluoroethane, propyl bromide, butyl chloride, and hexyl chloride. Preferably, halogenated lower alkanes are employed. A mixture of two or more such solvents can be used.

Reaction temperatures of 0–100° C. are suitable and a temperature in the range of 35–80° C. is preferred. Best results are obtained when the process is run at the reflux temperature of the organic solvent or its water azeotrope, and the bromine is introduced into the reaction mixture as a solution in the condensed solvent reflux. Agitation, either by boiling of the solvent mixture or by a stirrer or both, is beneficial in preventing local concentrations of unreacted bromine and the consequent production of highly colored materials.

In the operation of the process, the phenol is entirely or preferably only partially dissolved in the organic portion of the solvent system. The byproduct hydrogen bromide dissolves as it forms in the water phase of the reaction mixture. In effect as the bromination proceeds under preferred conditions, undissolved phenolic solids in the reaction mixture are being continuously washed with both the water and the inert solvent. After completion of the bromination, the reaction mixture is cooled and the brominated phenol, being essentially insoluble in both the aqueous phase and the limited amount of organic solvent phase of the cold solvent system, is substantially all precipitated as a white crystalline product requiring only routine washing and drying after it is separated from the reaction mixture by conventional means, for example, by decantation or by filtration. Because of this manner of operation, the best results are obtained when the organic portion and the aqueous portion of the mixed solvent system are present in certain proportions relative to the amount of the phenol and the degree to which the phenol is brominated. For example, about 0.05–0.5 liter of organic solvent per gram mole of phenol has been found to give a smooth, relatively rapid, and complete bromination and a good recovery of the brominated product. Similarly, it is advantageous to use about 0.2–20 liters of water per liter of organic solvent, employing enough water so that the liberated hydrogen halide remains substantially all in solution during the process. For practical operation it is necessary to use at least about 0.4 liter of total liquid per 100 g. of solids to permit proper handling of the reaction mixture. For complete bromination to a 2,4,6-trisubstituted phenol, it is advantageous to use sufficient water so that the concentration of HBr in the aqueous phase will not exceed about 35% by weight during the reaction. This result can also be accomplished by eliminating some of the acid during the reaction, for example, by a partial neutralization, preferably with a weak alkali such as $NaHCO_3$ or lime, or by drawing off some of the aqueous phase and adding fresh water.

The process described above is directed to the bromination of a phenol having at least one and preferably at least two of the positions on the benzene ring ortho and para to the phenolic hydroxyl occupied by hydrogen atoms replaceable by bromine. The process is advantageous in the monobromination of a phenolic ring, and it is particularly advantageous when applied to polybromination of such a phenol. Both mononuclear and polynuclear phenols such as bisphenols are brominated by the present process to yield products of superior quality. The process is especially adaptable to the tetrabromination of alkylidenebisphenols. For example, the useful tetrabromobisphenol A (4,4'-isopropylidenebis-2,6-dibromophenol) is produced by the present process as an unusually pure white crystalline material without need for recrystallization or other purification.

Bromine is preferably employed as the brominating agent. However, other known brominating agents may be used in the process, for example, the so-called bromine chloride, an equimolar mixture of bromine and chlorine, is advantageous in conserving the relatively expensive bromine. From about the theoretical quantity of brominating agent to about 10% in excess of that amount is preferably used in the process. For example, about 1.0–1.1 moles of bromine per mole of phenol gives best results in a monobromination, 2.0–2.2 moles of bromine per mole of phenol is preferred for a dibromination, and for the tetrabromination of a mole of bisphenol, 4.0–4.4 moles of bromine are used.

EXAMPLE 1

A mixture of one gram mole of p-p'-isopropylidenediphenol, 150 ml. of methylene chloride, and one liter of water was heated to refluxing at about 40° C. in a reactor flask equipped with a stirrer and a reflux condenser. Over a period of 6 hours, 4.2 g. moles of bromine was added through the condenser, thereby contacting the reaction mixture as a dilute solution of bromine in the refluxing methylene chloride. After the reaction was complete, the red color of excess bromine persisted in the reaction mixture even after several hours of additional refluxing. Excess bromine was then neutralized with sodium bisulfite, the reaction mixture was cooled to 10° C., and the solid present was separated by filtration. The filter cake was washed with cold methylene chloride and dried to obtain 508 g. of white crystalline 4,4'-isopropylidenebis(2,6-dibromophenol), a yield of 93% based on the starting bisphenol. This material had a freezing point of 181.3° C. and assayed 99.3% by bromine analysis. A solution of 10 g. in 50 ml. of methyl alcohol had an APHA color of 10. The recovered methylene chloride was suitable for reuse in the process.

EXAMPLE 2

By the procedure of Example 1, 8.16 g. moles of bromine was added in the reflux condensate to 2 g. moles of p,p'-isopropylidenediphenol in 300 ml. of ethylene dichloride and 2 liters of water at about 75° C. The addition of bromine was completed in 16 hours, after which the mixture was heated at reflux temperature overnight to react the last of the bromine. The mixture was then cooled to 10° C. and filtered to obtain 406 g. of yellowish brown mother liquor and a white filter cake which was rinsed with cold ethylene dichloride. The dried filter cake was a white crystalline solid, weight 984 g., freezing point 180.5° C. This product assayed 100% 4,4'-isopropylidenebis(2,6-dibromophenol) by bromine analysis and infrared examination revealed no detectable impurities. APHA color of 10 g. in 50 ml. of methanol was 25.

Example 3 illustrates the lowered quality of product obtained when the same bisphenol is brominated in water suspension with no organic solvent present.

EXAMPLE 3

A slurry of 0.5 g. mole of finely divided p,p'-isopropylidenediphenol in one liter of water was reacted at 70–75° C. with 2.0 g. moles of bromine, the bromine being added over a period of 4.75 hours as a solution in 500 ml. of 48% aqueous HBr. Two additional hours of agitation at this temperature were required to react the last traces of bromine. The reaction product was separated, washed with water, and dried to yield 263 g. of an off-white product assaying 98.6% as 4,4'-isopropylidenebis(2,6-dibromophenol), freezing point 164° C., APHA color 240 (10 g. in 50 ml. of methanol).

The quantity of bromine used in the process can be cut about in half by using an equimolar mixture of bromine and chlorine in place of bromine alone. In this mode of reaction, the byproduct is HCl rather than HBr.

The total bromine feed for this process can also be approximately halved by oxidizing the byproduct HBr in the aqueous layer to bromine by addition of a suitable oxidizing agent, for example, an inorganic halate such as an alkali metal chlorate or bromate. This variation of the process is illustrated by Example 4.

EXAMPLE 4

By the procedure of Example 1, 4.24 g. moles of bromine (53% of the theoretical for tetrabromination) was added in 45 minutes to a refluxing mixture of 2 g. moles of p,p'-isopropylidenediphenol in 400 ml. of methylene chloride and 2 liters of water. All added bromine was reacted at the end of this period. During the next hour, 20% aqueous sodium bromate was added to the refluxing mixture until the red color of excess bromine persisted. The mixture was heated at reflux temperature for an additional 30 minutes, excess bromine was removed by addition of sodium bisulfite, the reaction mixture was cooled, and the solid product was filtered, washed, and dried. A white crystalline product was obtained, assay 99.1% as 4,4'-isopropylidenebis(2,6-dibromophenol), freezing point 175.6° C., APHA color of 10 g. in 50 ml. methanol was 10.

As shown by Example 4, the total reaction time was reduced to 2.25 hours by the neutralization of the byproduct HBr during the course of the reaction. This compares to a reaction time of 16 hours in Example 2 using the same quantities of reactants and a time of 6 hours in Example 1 where the quantities were half those amounts. It has been found that minimum reaction times are obtained when the concentration of hydrogen halide in the aqueous phase is held to a maximum of about 4 g. moles per liter. This can be done by increasing the volume of water used by partial neutralization, or by replacing some of it with fresh water as previously described. Relatively small reaction volumes are usually preferred in commercial production.

EXAMPLE 5

A mixture of p,p'-isopropylidenediphenol, water, and methylene chloride in the proportions of Example 4 was treated with bromine as above until about 3.2 g. moles of bromine had been added. The HBr in the aqueous layer was then neutralized by addition of $NaHCO_3$ and the bromination was resumed as before. By this technique, the time required to feed in bromine was reduced to 2.0 hours as compared, for example, with the addition times of Examples 1 and 2, and the total reaction time was thereby significantly shortened. The product was similar in quality to the products of those examples and that of Example 4.

Similar reductions in reaction time are obtained by the use of this technique in the bromination of other phenols.

EXAMPLE 6

A slurry of 1 g. mole of p-phenylphenol in a mixture of one liter of water and 150 ml. of methylene chloride was heated to gentle reflux in a reaction flask equipped with stirrer and reflux condenser. While the temperature of the mixture was adjusted so as to maintain a steady reflux of methylene chloride, 2.0 g. moles of liquid bromine was added continuously over a period of 2.25 hours through the reflux condenser so as to admit the bromine into the reaction flask as a dilute solution in methylene chloride. The temperature of the reaction mixture rose from an initial 41° C. to 49° C. at the end of the bromination. The slurry was cooled to about 4° C. and filtered to separate the white crystalline product. After washing and drying, this first crop of crystals weighed 255 g., 84.5% of the theoretical quantity of product. Analysis showed this material to be 2,6-dibromo-4-phenylphenol of 99.7% purity by bromine assay. It melted at 105.3–107.1° C. and a solution of 10 g. in 50 ml. of methanol had an APHA color of 31.

EXAMPLE 7

By the procedure of Example 6 three gram moles of bromine was added over a period of 5.75 hours to a refluxing mixture of 1 g. mole of m-cresol, 1 liter of water, and 300 ml. of methylene chloride. The m-cresol used was a yellow viscous liquid of better than 99.5% cresol content. The reaction mixture was then heated at 43–44° C. for an additional hour. After cooling to room temperature, a first crop of yellowish white crystals was separated, weight 119 g. This product assayed 98.7% as 2,4,6-tribromo-m-cresol and had a melting point 81.2–82.4° C. A second crop of 53 g. of light yellow crystals was obtained, assay 98.6%, M.P. 81.4–82.2° C. By evaporation of the solvent, the remainder of the tribromocresol was obtained as yellow crystals melting at 80.5–81.6° C.

We claim:
1. In a process wherein a brominating agent is reacted with a phenol having at least one hydrogen atom replaceable by bromine in the positions ortho and para to the phenolic hydroxyl, thereby producing a brominated phenol and a hydrogen halide, the improvement wherein the phenol and the brominating agent are reacted in the presence of a solvent system having an aqueous phase and an organic solvent phase, said solvent system consisting essentially of 0.2–20 volumes of water and one volume of an organic solvent selected from the group consisting of an alkane of 5–10 carbon atoms, carbon disulfide, benzene, fluorobenzene, chlorobenzene, and a halogenated alkane of 1–6 carbon atoms.

2. The process of claim 1 wherein the organic solvent is a halogenated lower alkane of 1–6 carbon atoms.

3. The process of claim 1 wherein the concentration of hydrogen halide in the aqueous phase is maintained below about 4 molar.

4. The process of claim 2 wherein the brominating agent is bromine.

5. The process of claim 4 wherein the phenol is p,p'-isopropylidenediphenol.

6. A process for making 4,4'-isopropylidenebis(2,6-dibromophenol) which comprises reacting p,p'-isopropylidenediphenol with about 4.0–4.4 molar equivalents of bromine in the presence of a solvent system consisting essentially of 0.2–20 volumes of water and one volume of an organic solvent selected from the group consisting of an alkane of 5–10 carbon atoms, carbon disulfide, benzene, fluorobenzene, chlorobenzene, and a halogenated alkane of 1–6 carbon atoms at the reflux temperature of the solvent system by adding the bromine as a solution in the condensed solvent reflux.

7. The process of claim 6 wherein the organic solvent is a halogenated lower alkane of 1–6 carbon atoms.

8. The process of claim 7 wherein the organic solvent is methylene chloride.

9. The process of claim 7 wherein a halate selected from the group consisting of inorganic chlorates and bromates is added to the solvent.

10. The process of claim 1 wherein the brominating agent is reacted with the phenol at the reflux temperature of the solvent system by adding the brominating agent as a solution in the condensed solvent reflux.

11. A process for making 4,4'-isopropylidenebis(2,6-dibromophenol) which comprises reacting p,p'-isopropylidenediphenol with about 4.0–4.4 molar equivalents of bromine in the presence of a solvent system consisting essentially of 0.2–20 volumes of water and one volume of an organic solvent selected from the group consisting of benzene, chlorobenzene and halogenated alkanes of 1–6 carbon atoms at a temperature between 0° and 100° C.

References Cited

UNITED STATES PATENTS

| | | | |
|---|---|---|---|
| 3,029,291 | 4/1962 | Dietzler | 260—619A |
| 3,143,575 | 8/1964 | Bryner et al. | 260—619A |

FOREIGN PATENTS

| | | | |
|---|---|---|---|
| 1,313,469 | 11/1962 | France | 260—619A |

LEON ZITVER, Primary Examiner

N. P. MORGENSTERN, Assistant Examiner

U.S. Cl. X.R.

260—620, 623